(12) United States Patent
Ogawa

(10) Patent No.: US 11,097,718 B2
(45) Date of Patent: Aug. 24, 2021

(54) HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 15/984,665

(22) Filed: May 21, 2018

(65) Prior Publication Data

US 2018/0339697 A1    Nov. 29, 2018

(30) Foreign Application Priority Data

May 26, 2017 (JP) .............................. JP2017-104251

(51) Int. Cl.
| | |
|---|---|
| *B60W 20/13* | (2016.01) |
| *B60K 6/445* | (2007.10) |
| *B60W 10/06* | (2006.01) |
| *B60W 10/08* | (2006.01) |
| *B60W 10/26* | (2006.01) |

(Continued)

(52) U.S. Cl.
CPC .............. *B60W 20/13* (2016.01); *B60K 6/445* (2013.01); *B60W 10/06* (2013.01); *B60W 10/08* (2013.01); *B60W 10/26* (2013.01); *B60K 2001/0455* (2013.01); *B60L 53/00* (2019.02); *B60W 50/082* (2013.01); *B60W 2510/244* (2013.01); *B60W 2556/50* (2020.02); *B60W 2710/244* (2013.01)

(58) Field of Classification Search
CPC ...... B60W 20/13; B60W 10/06; B60W 10/08; B60W 10/26; B60W 2556/50; B60W 2710/244; B60W 50/082; B60W 2510/244; B60W 20/12; B60W 20/14; B60K 6/445; B60K 2001/0455; B60K 6/20; B60L 53/00; B60R 16/04; G08G 1/16

See application file for complete search history.

(56) References Cited

U.S. PATENT DOCUMENTS

| | | | |
|---|---|---|---|
| 9,469,292 B2 | 10/2016 | Hisano | |
| 2003/0078707 A1 | 4/2003 | Shioda et al. | |

(Continued)

FOREIGN PATENT DOCUMENTS

| | | |
|---|---|---|
| CN | 104512409 A | 4/2015 |
| CN | 105035078 A | 11/2015 |

(Continued)

*Primary Examiner* — Adam R Mott
(74) *Attorney, Agent, or Firm* — Sughrue Mion, PLLC

(57) ABSTRACT

A hybrid vehicle includes: an internal combustion engine; a motor generator; an electric storage device electrically connected with the motor generator; and a control device configured to set a control mode of an electric storage level of the electric storage device, to one of a charge depleting mode and a charge sustaining mode. The control device is configured to expand a permissible fluctuation band of the electric storage level during the charge sustaining mode, when the control device is performing a first switching control, compared to when the control device is not performing the first switching control, the first switching control being a control in which the control device automatically performs switching between the charge depleting mode and the charge sustaining mode, at least partly based on a predicted load on a planned traveling route for the hybrid vehicle.

10 Claims, 10 Drawing Sheets

(51) Int. Cl.
  *B60K 1/04* (2019.01)
  *B60L 53/00* (2019.01)
  *B60W 50/08* (2020.01)

(56) References Cited

U.S. PATENT DOCUMENTS

| | | | |
|---|---|---|---|
| 2009/0101421 A1* | 4/2009 | Oyobe | B60K 6/26 180/65.29 |
| 2009/0277702 A1* | 11/2009 | Kanada | B60K 6/365 180/65.29 |
| 2010/0280687 A1 | 11/2010 | Tate, Jr. et al. | |
| 2013/0096764 A1* | 4/2013 | Yamamoto | B60K 6/445 701/22 |
| 2014/0114514 A1 | 4/2014 | Crombez et al. | |
| 2015/0094892 A1 | 4/2015 | Kanehara | |
| 2015/0241234 A1* | 8/2015 | Ogawa | B60W 20/12 701/22 |
| 2015/0307083 A1* | 10/2015 | Hisano | B60W 50/085 701/22 |
| 2016/0082826 A1 | 3/2016 | Aoki | |
| 2016/0231123 A1 | 8/2016 | Morisaki | |
| 2016/0339903 A1 | 11/2016 | Hokoi | |
| 2017/0066429 A1 | 3/2017 | Ogawa | |
| 2018/0162359 A1* | 6/2018 | Perkins | B60W 30/18127 |

FOREIGN PATENT DOCUMENTS

| | | |
|---|---|---|
| CN | 105857299 A | 8/2016 |
| JP | 2007-99223 A | 4/2007 |
| JP | WO2011/161814 A1 | 12/2011 |
| JP | 2013-216257 A | 10/2013 |
| JP | 2014-148925 A | 8/2014 |
| JP | 2015-071342 A | 4/2015 |
| JP | 2015-209153 A | 11/2015 |
| JP | 2016-060379 A | 4/2016 |
| JP | 2016-141361 A | 8/2016 |
| JP | 2016-215838 A | 12/2016 |

* cited by examiner

HYBRID VEHICLE

INCORPORATION BY REFERENCE

The disclosure of Japanese Patent Application No. 2017-104251 filed on May 26, 2017 including the specification, drawings and abstract is incorporated herein by reference in its entirety.

BACKGROUND

1. Technical Field

The disclosure relates to a hybrid vehicle, particularly, a hybrid vehicle including an electric storage device that stores electric power for driving. More particularly, the disclosure relates to a hybrid vehicle capable of setting a mode for controlling the electric storage level of the electric storage device, to one of a charge depleting (CD) mode and a charge sustaining (CS) mode.

2. Description of Related Art

Japanese Patent Application Publication No. 2016-215838 discloses a hybrid vehicle including an engine, a first motor generator that can generate electric power using dynamic power of the engine, a second motor generator that is connected with a drive wheel, and a battery that stores electric power for traveling. In the hybrid vehicle, an SOC control mode is switched depending on the state-of-charge (SOC) of the battery. Specifically, until the SOC decreases to a predetermined lower limit value (the SOC is depleted), the SOC control mode is set to a charge depleting mode (hereinafter, referred to as a CD mode), from the standpoint of the improvement of fuel efficiency. On the other hand, after the SOC of the battery decreases to the above lower limit value (after the SOC is depleted), the SOC control mode is set to a charge sustaining mode (hereinafter, referred to as a CS mode), from the standpoint of the protection of the battery.

The CD mode is a control mode in which the hybrid vehicle consumes the SOC of the battery by traveling using the discharge electric power of the battery without operating the engine as much as possible. The CS mode is a control mode in which the hybrid vehicle sustains the SOC of the battery as much as possible by restraining the discharge of the battery or performing the charge of the battery while making the engine operate easier than in the CD mode.

SUMMARY

In the CS mode disclosed in JP 2016-215838 A, the charge-discharge amount of the battery is regulated such that the SOC is sustained as stable as possible, and therefore, an SOC fluctuation band is restricted to a small value. As a result, in the CS mode in the related art, the driving state of the engine tends to be limited by SOC requirement.

Meanwhile, for example, when a destination of the vehicle is set and the traveling load on a planned traveling route to the destination can be predicted, the vehicle can execute a control (hereinafter, also referred to as a "first switching control") of automatically performing the switching between the CD mode and the CS mode depending on the predicted load on the planned traveling route such that the SOC of the battery is depleted at the time of arrival at the destination.

However, during the CS mode set by the first switching control, when the SOC is controlled to be sustained as much as possible similarly to the CS mode in the related art, there is a concern that the optimal charge-discharge to the fuel efficiency cannot be performed when the SOC deviates from an SOC control reference, so that the fuel efficiency decreases.

An aspect of the disclosure provides a hybrid vehicle that can restrain the decrease in fuel efficiency during the CS mode set by the first switching control.

A hybrid vehicle according to an aspect of the disclosure includes: an internal combustion engine; a motor generator connected with at least one of the internal combustion engine and a drive wheel; an electric storage device electrically connected with the motor generator; and a control device configured to set a control mode of an electric storage level of the electric storage device, to one of a charge depleting mode and a charge sustaining mode. The control device is configured to expand a permissible fluctuation band of the electric storage level of the electric storage device during the charge sustaining mode, when the control device is performing a first switching control, compared to when the control device is not performing the first switching control, the first switching control being a control in which the control device automatically performs switching between the charge depleting mode and the charge sustaining mode, at least partly based on a predicted load on a planned traveling route for the hybrid vehicle.

In the configuration, when the control device is performing the first switching control, the permissible fluctuation band of the electric storage level during the CS mode is expanded compared to when the control device is not performing the first switching control. Therefore, during the CS mode set by the first switching control, the driving state of the internal combustion engine is easily determined depending on the thermal efficiency of the internal combustion engine. As a result, it is possible to restrain the decrease in fuel efficiency during the CS mode set by the first switching control.

In the above aspect, the control device may be configured to expand the permissible fluctuation band of the electric storage level during the charge sustaining mode, when the control device is performing the first switching control and the electric storage level is higher than a lower limit of the electric storage level allowing traveling in the charge depleting mode, compared to when the control device is not performing the first switching control.

In the configuration, when the control device is performing the first switching control and the electric storage level of the electric storage device is higher than the lower limit (that is, when the need to protect the electric storage device is low), the permissible fluctuation band of the electric storage level during the CS mode is expanded. Therefore, during the CS mode set by the first switching control, it is possible to restrain the fuel efficiency from unnecessarily decreasing even though the need to protect the battery is low.

In the above aspect, the control device may be configured to prevent the electric storage level from departing from a reference value by performing a guard process of restricting a required charge-discharge power of the electric storage device within a range between an upper limit guard value and a lower limit guard value, and the control device may be configured to expand the permissible fluctuation band of the electric storage level during the charge sustaining mode by disabling or relaxing the restriction of the required charge-discharge power by the guard process.

In the configuration, it is possible to expand the permissible fluctuation band of the electric storage level during the CS mode, by a simple process of disabling or relaxing the restriction of the required charge-discharge power by the guard process.

In the above aspect, the control device may be configured to stop the internal combustion engine when a required power decreases to less than a stop threshold during operation of the internal combustion engine, and to expand a permissible increase band of the electric storage level during the charge sustaining mode by decreasing the stop threshold when the control device is performing the first switching control and a vehicle speed is included in a high-speed region, compared to when the control device is not performing the first switching control.

In the configuration, when the vehicle speed is included in the high-speed region during the CS mode set by the first switching control, the permissible increase band of the electric storage level is expanded by decreasing the stop threshold. Thereby, in the high-speed region, in which the thermal efficiency of the engine is high, the engine is hard to be stopped, and a state where the engine is operating is easily sustained. As a result, it is possible to make the engine operate easier in the state where the thermal efficiency of the engine is high, and it is possible to improve the fuel efficiency.

In the above aspect, the control device may be configured to start the internal combustion engine when a required power of the internal combustion engine exceeds a start threshold during stop of the internal combustion engine, and to expand a permissible decrease band of the electric storage level during the charge sustaining mode by increasing the start threshold when the control device is performing the first switching control and a vehicle speed is included in a low-speed region, compared to when the control device is not performing the first switching control.

In the configuration, when the vehicle speed is included in the low-speed region during the CS mode set by the first switching control, the permissible decrease band of the electric storage level is expanded by increasing the start threshold. Thereby, in the low-speed region, in which the thermal efficiency of the engine is low, the engine is hard to be started, and a state where the engine is stopped is easily sustained. As a result, it is possible to make the engine operate harder in the state where the thermal efficiency of the engine is low, and it is possible to restrain the decrease in fuel efficiency more appropriately.

In the above aspect, the control device may be configured to stop the internal combustion engine when a required power decreases to less than a stop threshold during operation of the internal combustion engine, and to expand a permissible increase band of the electric storage level during the charge sustaining mode by decreasing the stop threshold when the control device is performing the first switching control and the internal combustion engine is operating, compared to when the control device is not performing the first switching control.

In the configuration, when the internal combustion engine is operating during the CS mode set by the first switching control, the permissible increase band of the electric storage level is expanded by decreasing the stop threshold. Thereby, the engine is hard to be stopped, and accordingly, the number of starts of the engine is reduced. As a result, it is possible to improve drivability.

In the above aspect, the control device may be configured to reduce a permissible increase band of the electric storage level when a remaining distance to a destination becomes shorter than a threshold distance during an expansion of the fluctuation band of the electric storage level of the electric storage device.

When the fluctuation band (increase band) of the electric storage level is expanded during the CS mode set by the first switching control in spite of a near destination, there is a concern that an electric storage level higher than expected remains at the time of the arrival at the destination.

Hence, in the above configuration, the permissible increase band of the electric storage level is reduced when the remaining distance to the destination becomes shorter than the threshold distance during the expansion of the fluctuation band of the electric storage level. Thereby, it is possible to restrain the electric storage level from being higher than expected, at the time of the arrival at the destination.

In the above aspect, the control device may be configured to reduce a permissible decrease band of the electric storage level when the electric storage level becomes lower than a threshold level during an expansion of the fluctuation band of the electric storage level of the electric storage device.

When the fluctuation band (decrease band) of the electric storage level is expanded during the CS mode set by the first switching control even though the electric storage level is close to the lower limit, there is a concern that the electric storage level decreases to the lower limit before the arrival at the destination and the first switching control ends earlier than expected.

Hence, in the above configuration, the permissible decrease band of the electric storage level is reduced when the electric storage level becomes lower than the threshold level during the expansion of the fluctuation band of the electric storage level. Thereby, it is possible to restrain the electric storage level from decreasing to the lower limit before the arrival at the destination, and it is possible to restrain the first switching control from ending earlier than expected.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
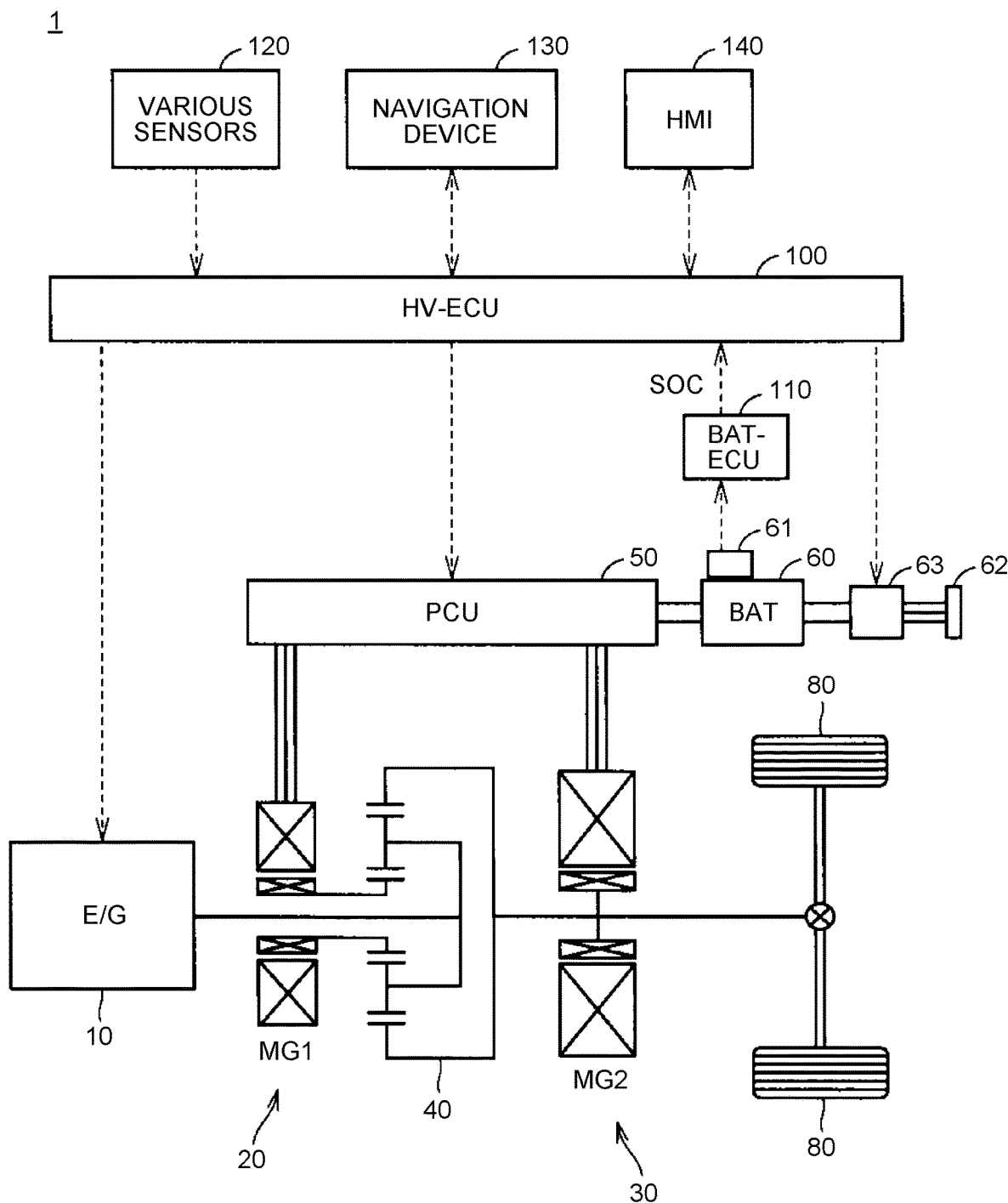
FIG. 1 is a whole configuration diagram of a vehicle.

Hereinafter, embodiments of the disclosure will be described in detail, with reference to the drawings. In the drawings, identical reference characters are assigned to identical or equivalent parts, and descriptions therefor are not repeated.

FIG. 1 is a whole configuration diagram of a vehicle 1 in the embodiment. The vehicle 1 is a so-called plug-in hybrid vehicle. The vehicle 1 includes an engine 10, a first motor generator (hereinafter, referred to as a "first MG") 20, a second motor generator (hereinafter, referred to as a "second MG") 30, a power split device 40, a power control unit (PCU) 50, an electric storage device 60, an inlet 62, a charger 63, and drive wheels 80.

The engine 10 is an internal combustion engine that outputs dynamic power by converting combustion energy generated when air-fuel mixture of air and fuel is combusted, into kinetic energy of a moving body such as a piston and a rotor. The power split device 40, for example, includes a planetary gear mechanism having three rotation axes for a sun gear, a carrier and a ring gear. The power split device 40 divides the dynamic power output from the engine 10, into dynamic power for driving the first MG 20 and dynamic power for driving the drive wheels 80.

The first MG 20 and the second MG 30 are alternating-current motor generators, and for example, are three-phase alternating-current synchronous electric motors including rotors in which permanent magnets are buried. The first MG 20 is used mainly as an electric generator that is driven by the engine 10 through the power split device 40. Electric power generated by the first MG 20 is supplied to the second MG 30 or the electric storage device 60 through the PCU 50.

The second MG 30 operates mainly as an electric motor, and drives the drive wheels 80. The second MG 30 is driven by receiving at least one of electric power from the electric storage device 60 and electric power generated by the first MG 20, and driving force of the second MG 30 is transmitted to the drive wheels 80. Meanwhile, at the time of braking the vehicle 1 or at the time of reducing acceleration on a downward slope, the second MG 30 operates as an electric generator to perform electric power regeneration. The electric power generated by the second MG 30 is restored in the electric storage device 60 through the PCU 50.

The vehicle 1 shown in FIG. 1 is a hybrid vehicle including the engine 10 and the two motor generators (the first MG 20 and the second MG 30) as driving sources, but vehicles to which the disclosure can be applied are not limited to the vehicle 1 shown in FIG. 1. For example, the disclosure can be also applied to a hybrid vehicle including an engine and a single motor generator.

The PCU 50 converts direct-current power received from the electric storage device 60, into alternating-current power for driving the first MG 20 and the second MG 30. Further, the PCU 50 converts alternating-current power generated by the first MG 20 and the second MG 30, into direct-current power for charging the electric storage device 60. For example, the PCU 50 is configured to include two inverters that are provided so as to correspond to the first MG 20 and the second MG 30, and converters that raise direct-current voltage to be supplied to the inverters, to equal to or higher than the voltage of the electric storage device 60.

The electric storage device 60 is a rechargeable direct-current power source, and for example, is configured to include a secondary battery such as a lithium ion battery and a nickel-hydrogen battery. The electric storage device 60 is charged by receiving electric power generated by at least one of the first MG 20 and the second MG 30. Then, the electric storage device 60 supplies the stored electric power to the PCU 50. As the electric storage device 60, an electric double layer capacitor or the like can be also employed.

On the electric storage device 60, a monitoring unit 61 is provided. The monitoring unit 61 includes a voltage sensor, a current sensor and a temperature sensor (they are not illustrated) that detect the voltage, input-output current and temperature of the electric storage device 60, respectively. The monitoring unit 61 outputs detection values (the voltage, input-output current and temperature of the electric storage device 60) of the sensors, to a BAT-ECU 110.

The inlet 62 is configured to be connected with a power feed apparatus (not illustrated) in the exterior of the vehicle. The charger 63 is provided between the inlet 62 and the electric storage device 60. The charger 63, which is controlled by a control signal from an HV-ECU 100, converts external electric power to be input from the power feed apparatus in the exterior of the vehicle, into electric power allowing the electric storage device 60 to be charged, and outputs the converted electric power to the electric storage device 60. Hereinafter, the charge of the electric storage device 60 with use of the external electric power is referred to as an "external charge".

The vehicle 1 further includes an HV-ECU (Electronic Control Unit) 100, a BAT-ECU 110, various sensors 120, a navigation device 130, and a human machine interface (HMI) device 140.

Figure 2:
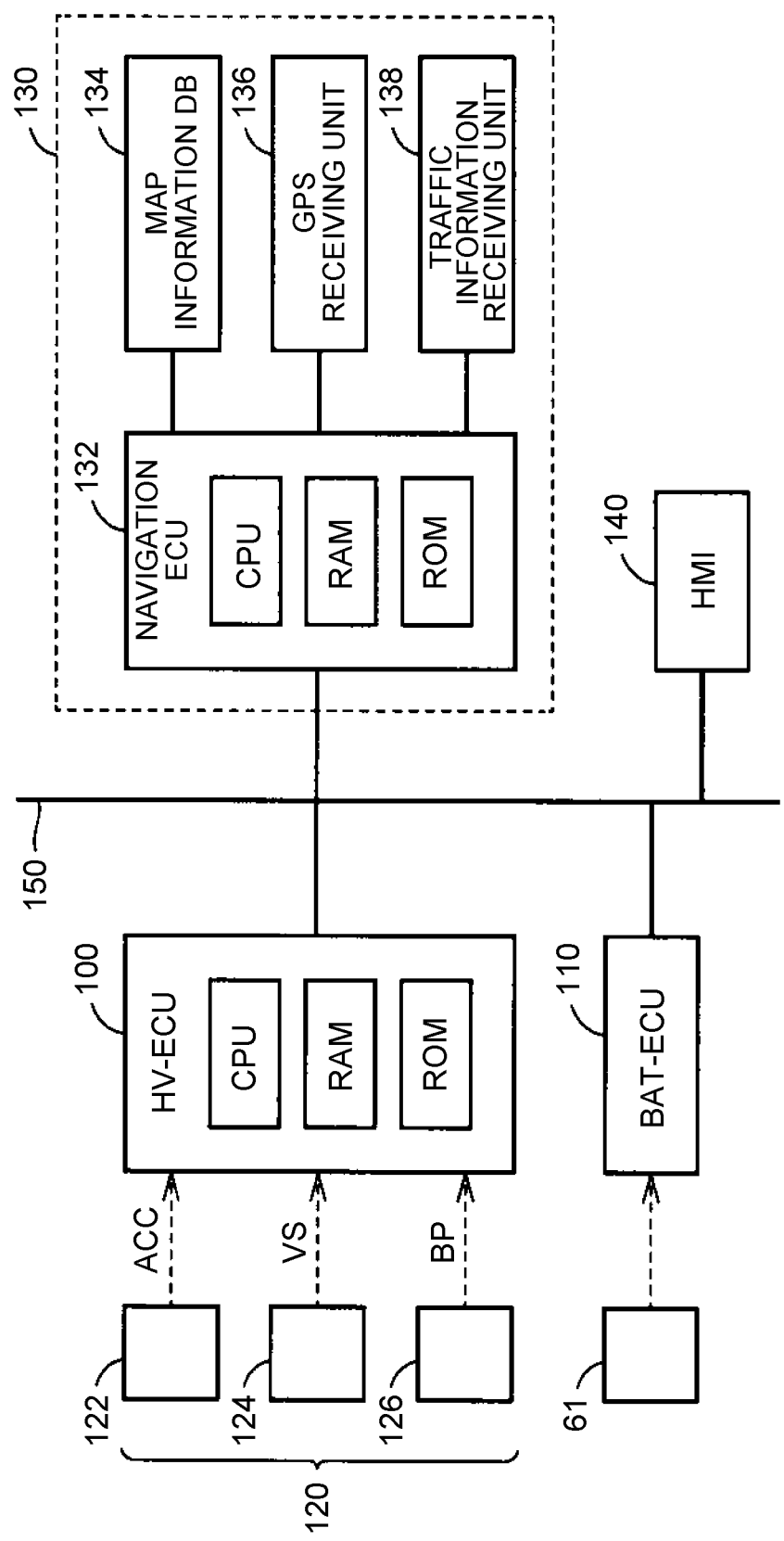
FIG. 2 is a block diagram showing a detailed configuration of an HV-ECU, various sensors and a navigation device.

FIG. 2 is a block diagram showing a detailed configuration of the HV-ECU 100, various sensors 120 and the navigation device 130 shown in FIG. 1. The HV-ECU 100, the BAT-ECU 110, the navigation device 130 and the HMI device 140 are configured to communicate with each other through a controller area network (CAN) 150.

For example, the various sensors 120 include an accelerator pedal sensor 122, a speed sensor 124 and a brake pedal sensor 126. The accelerator pedal sensor 122 detects an accelerator pedal operation amount (hereinafter, also referred to as an "accelerator operation amount") ACC by a user. The speed sensor 124 detects a vehicle speed VS of the vehicle 1. The brake pedal sensor 126 detects a brake pedal operation amount BP by the user. The respective sensors output detection results to the HV-ECU 100.

The HV-ECU 100 includes a central processing unit (CPU), a read only memory (ROM) in which processing programs and the like are stored, a random access memory (RAM) in which data is temporarily stored, input-output ports (not illustrated) through which various signals are input and output, and the like. The HV-ECU 100 executes predetermined computation processes based on information stored in the memories (the ROM and the RAM), information from the various sensors 120 and information from the BAT-ECU 110. Then, the HV-ECU 100 controls devices such as the engine 10, the PCU 50 and the HMI device 140, based on results of the computation processes.

The BAT-ECU 110 also includes a CPU, a ROM, a RAM, input-output ports, and the like (they are not illustrated). The BAT-ECU 110 calculates an SOC indicating the electric storage level of the electric storage device 60, based on the detection value of the input-output current and/or voltage of the electric storage device 60 from the monitoring unit 61. For example, the SOC expresses the electric storage level of the electric storage device 60 at the current time to the full charge capacity, in percentage. The BAT-ECU 110 outputs the calculated SOC to the HV-ECU 100. The SOC may be calculated in the HV-ECU 100.

Further, the BAT-ECU 110 outputs the detection values of the temperature of the electric storage device 60 by the monitoring unit 61, to the HV-ECU 100.

The navigation device 130 includes a navigation ECU 132, a map information database (DB) 134, a global positioning system (GPS) receiving unit 136, and a traffic information receiving unit 138.

The map information DB 134, which is configured by a hard disk drive (HDD) and the like, stores map information. The map information includes data about "nodes" such as intersections and dead ends, "links" connecting nodes, and "facilities" (buildings, parking areas and the like) along links. The map information includes position information about each node, distance information about each link, road category information (information such as urban road, expressway and general road) about each link, gradient information about each link, and the like.

The GPS receiving unit 136 acquires the current position of the vehicle 1, based on signals (electric waves) from GPS satellites (not illustrated), and outputs a signal indicating the current position of the vehicle 1, to the navigation ECU 132.

The traffic information receiving unit 138 receives road traffic information (for example, VICS® information) that is provided by an FM multiplex broadcast or the like. The road traffic information includes at least traffic congestion information, and in addition, may include road regulation information, parking area information, or the like. The road traffic information is updated every five minutes, for example.

The navigation ECU 132 includes a CPU, a ROM, a RAM, input-output ports (not illustrated), and the like, and outputs the current position of the vehicle 1 and the map information, traffic congestion information and others about the periphery, to the HMI device 140 and the HV-ECU 100, based on a variety of information and signals received from the map information DB 134, the GPS receiving unit 136 and the traffic information receiving unit 138.

When the user inputs a destination of the vehicle 1 to the HMI device 140, the navigation ECU 132 searches a planned traveling route from the current position of the vehicle 1 to the destination, based on the map information DB 134. The planned traveling route is configured by an aggregation of nodes and links from the current position of the vehicle 1 to the destination. The navigation ECU 132 outputs the search result (the aggregation of nodes and links) from the current position of the vehicle 1 to the destination, to the HMI device 140.

Further, in response to a request from the HV-ECU 100, the navigation ECU 132 outputs the map information and road traffic information (hereinafter, also referred to as "foreseen route information") about the planned traveling route from the current position of the vehicle 1 to the destination, to the HV-ECU 100. The foreseen route information is used for a "first CD-CS switching control" described later.

The HMI device 140 is a device that provides information for assisting drive of the vehicle 1, to the user. The HMI device 140, typically, is a display that is provided in a cabin of the vehicle 1, and includes a speaker and the like. The HMI device 140 provides a variety of information to the user, by outputting visual information (graphic information, textual information), audio information (voice information, sound information), and the like.

The HMI device 140 functions as a display of the navigation device 130. That is, the HMI device 140 receives the current position of the vehicle 1 and the map information, traffic congestion information and others about the periphery, from the navigation device 130 through the CAN 150, and displays the current position of the vehicle 1 together with the map information and traffic congestion information about the periphery.

Further, the HMI device 140 functions as a touch panel that can be operated by the user. By touching the touch panel, the user can change the scale of a displayed map or can input the destination of the vehicle 1, for example. When the destination is input to the HMI device 140, information about the destination is sent to the navigation device 130 through the CAN 150.

As described above, the navigation ECU 132 outputs the "foreseen route information" to the HV-ECU 100, in response to the request from the HV-ECU 100.

The HV-ECU 100 sets a mode for controlling the SOC of the electric storage device 60 (hereinafter, referred to as merely an "SOC control mode"), to one of a CD mode and a CS mode, and controls the engine 10, the first MG 20 and the second MG 30, depending on the set control mode.

The CD mode is a mode in which the vehicle 1 consumes the SOC (electric storage level) of the electric storage device 60 by traveling using the discharge electric power of the electric storage device 60 without operating the engine 10 as much as possible. The CS mode is a mode in which the vehicle 1 sustains the SOC of the electric storage device 60 as much as possible by restraining the discharge of the electric storage device 60 or performing the charge of the electric storage device 60 while making the engine 10 operate easier than in the CD mode.

When the user performs an operation for requesting the CS mode (for example, when the user pushes an unillustrated CS mode selection switch), the HV-ECU 100 sets the SOC control mode to the CS mode.

When the user does not perform the operation for requesting the CS mode, the HV-ECU 100 automatically performs the switching between the CD mode and the CS mode. On this occasion, the HV-ECU 100 changes the manner of the automatic switching between the CD mode and the CS mode, depending on whether the planned traveling route for the vehicle 1 has been set.

Specifically, when the planned traveling route has not been set, the HV-ECU 100 performs a "second CD-CS switching control" (normal CD-CS switching control) of performing the switching between the CD mode and the CS mode depending on the SOC.

On the other hand, when the planned traveling route has been set, the HV-ECU 100 performs a "first CD-CS switching control" of automatically performing the switching between the CD mode and the CS mode using a predicted load on the planned traveling route.

Driving Control

First, a driving control of the vehicle 1 that is executed by the HV-ECU 100 will be described before detailed description of the CD-CS switching controls (the second CD-CS switching control and the first CD-CS switching control).

Figure 3:
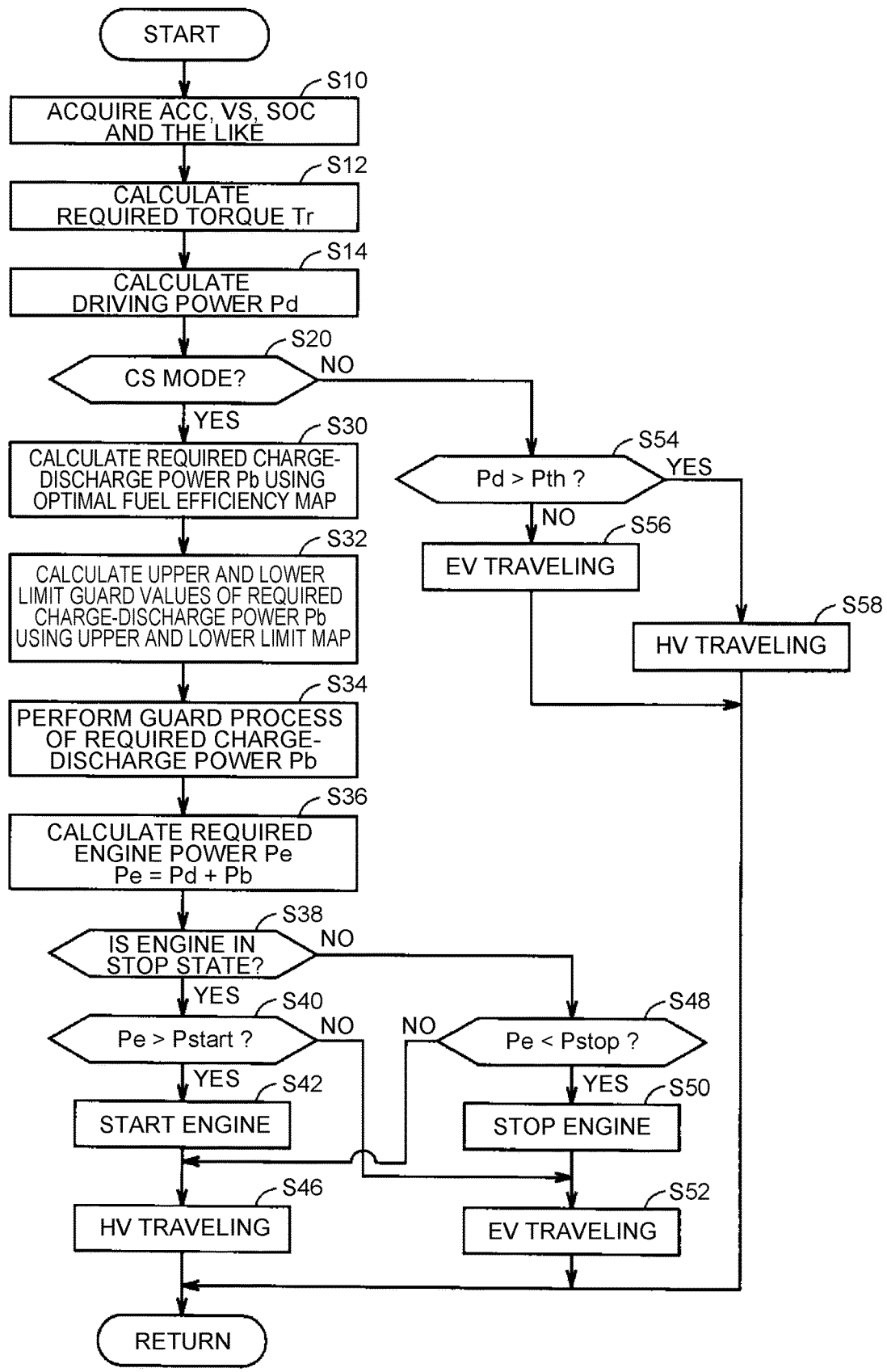
FIG. 3 is a flowchart (1) showing an exemplary processing procedure of the HV-ECU.

FIG. 3 is a flowchart showing an exemplary processing procedure of the driving control that is executed by the HV-ECU 100. For example, a sequence of processes shown in the flowchart is repeatedly executed at a predetermined interval while a system switch of the vehicle 1 is in an on-state.

The HV-ECU 100 acquires the detection values of the accelerator operation amount ACC and the vehicle speed VS from the accelerator pedal sensor 122 and the speed sensor 124, respectively, and acquires the SOC of the electric storage device 60 from the BAT-ECU 110 (step S10).

Next, the HV-ECU 100 calculates a required torque Tr for the vehicle 1, based on the acquired detection values of the accelerator operation amount ACC and the vehicle speed VS (step S12). Then, the HV-ECU 100 calculates a driving power Pd (required value) for the vehicle 1, by multiplying the calculated required torque Tr by the vehicle speed VS (step S14).

Subsequently, the HV-ECU 100 determines whether the SOC control mode at the current time is the CS mode (step S20).

When the HV-ECU 100 determines in step S20 that the SOC control mode at the current time is the CS mode (YES in step S20), the HV-ECU 100 calculates a required charge-discharge power Pb of the electric storage device 60, using an optimal fuel efficiency map (step S30). When the required charge-discharge power Pb is a positive value, the required charge-discharge power Pb indicates that the charge of the electric storage device 60 is required, and when the required charge-discharge power Pb is a negative value, the required charge-discharge power Pb indicates that the discharge of the electric storage device 60 is required.

The optimal fuel efficiency map is a map in which the required charge-discharge power Pb optimizing the thermal efficiency of the engine 10 when the engine 10 operates is specified using the driving power Pd and the vehicle speed VS as parameters.

Next, the HV-ECU 100 calculates upper and lower limit guard values (an upper limit guard value and a lower limit guard value) of the required charge-discharge power Pb, using an upper and lower limit map (step S32). The upper and lower limit map is a map in which the upper and lower limit guard values of the required charge-discharge power Pb are specified such that the SOC does not excessively depart from a reference value (SOC target value), using the SOC and the vehicle speed VS as parameters. Accordingly, a speed at which the SOC follows the reference value (target value) when the SOC deviates from the reference value (hereinafter, referred to as merely an "SOC following speed") is determined depending on the upper and lower limit guard values that are calculated using the upper and lower limit map.

Next, the HV-ECU 100 performs a "guard process" of restricting the required charge-discharge power Pb calculated using the optimal fuel efficiency map in step S30, using the upper and lower limit guard values calculated using the upper and lower limit map in step S32 (step S34). The required charge-discharge power Pb after the restriction by the guard process is a required charge-discharge power allowing the engine 10 to operate such that the thermal efficiency of the engine 10 is high while the SOC does not excessively depart from the reference value.

Next, as shown by the following Expression (1), the HV-ECU 100 calculates the total value of the driving power Pd calculated in step S14 and the required charge-discharge power Pb calculated in steps S30 to S34, as a required engine power Pe that is required for the engine 10 (step S36).

$$Pe=Pd+Pb \quad (1)$$

Next, the HV-ECU 100 determines whether the engine 10 is in a stop state (step S38).

When the HV-ECU 100 determines in step S38 that the engine 10 is in the stop state (YES in step S38), the HV-ECU 100 determines whether the required engine power Pe is more than a predetermined engine start threshold Pstart (step S40).

When the HV-ECU 100 determines in step S40 that the required engine power Pe is more than the engine start threshold Pstart (YES in step S40), the HV-ECU 100 starts the engine 10 (step S42). Then, the HV-ECU 100 controls the engine 10 and the PCU 50 such that the vehicle 1 travels using both of outputs of the engine 10 and the second MG 30. That is, the vehicle 1 performs a hybrid traveling (HV traveling), using the outputs of the engine 10 and the second MG 30 (step S46).

On the other hand, when the HV-ECU 100 does not determine in step S40 that the required engine power Pe is more than the engine start threshold Pstart (NO in step S40), the HV-ECU 100 performs a motor traveling (EV traveling) in which the vehicle 1 travels using only the output of the second MG 30 while the engine 10 is in the stop state (step S52).

When the HV-ECU 100 does not determine in step S38 that the engine 10 is in the stop state (NO in step S38), that is, when the engine 10 is operating, the HV-ECU 100 determines whether the required engine power Pe is less than a predetermined engine stop threshold Pstop (step S48).

When the HV-ECU 100 determines in step S48 that the required engine power Pe is less than the engine stop threshold Pstop (YES in step S48), the HV-ECU 100 stops the engine 10 (step S50), and performs the EV traveling (step S52).

On the other hand, when the HV-ECU 100 does not determine in step S48 that the required engine power Pe is less than the engine stop threshold Pstop (NO in step S48), the HV-ECU 100 performs the HV traveling while the engine 10 is operating (step S46).

When the HV-ECU 100 does not determine in step S20 that the SOC control mode is the CS mode (NO in step S20), that is, when the SOC control mode is the CD mode, the HV-ECU 100 determines whether the driving power Pd calculated in step S14 is more than a predetermined power Pth (step S54).

When the HV-ECU 100 does not determine in step S54 that the driving power Pd is more than the predetermined power Pth (NO in step S54), the HV-ECU 100 stops the engine 10, and performs the EV traveling (step S56).

On the other hand, when the HV-ECU 100 determines in step S54 that the driving power Pd is more than the predetermined power Pth (YES in step S54), the HV-ECU 100 operates the engine 10, and performs the HV traveling (step S58).

Second CD-CS Switching Control (Normal CD-CS Switching Control)

First, details of the second CD-CS switching control will be described before description of details of the first CD-CS switching control described later. Hereinafter, the second CD-CS switching control is also referred to as the "normal CD-CS switching control".

During the second CD-CS switching control, the HV-ECU 100 sets the SOC control mode to the CD mode until the SOC decreases to a predetermined value Sth. Thereby, the external electric power stored in the electric storage device 60 is consumed in preference to the fuel for the engine 10, resulting in the improvement of the fuel efficiency. On the other hand, after the SOC decreases to the predetermined value Sth, the HV-ECU 100 sets the SOC control mode to the CS mode, from the standpoint of the protection of the electric storage device 60. Here, the "predetermined value Sth" is a lower limit value of the SOC that allows the traveling in the CD mode, and is previously determined by developers or the like.

Hereinafter, the CS mode set by the second CD-CS switching control is also referred to as a "second CS mode".

Figure 4:
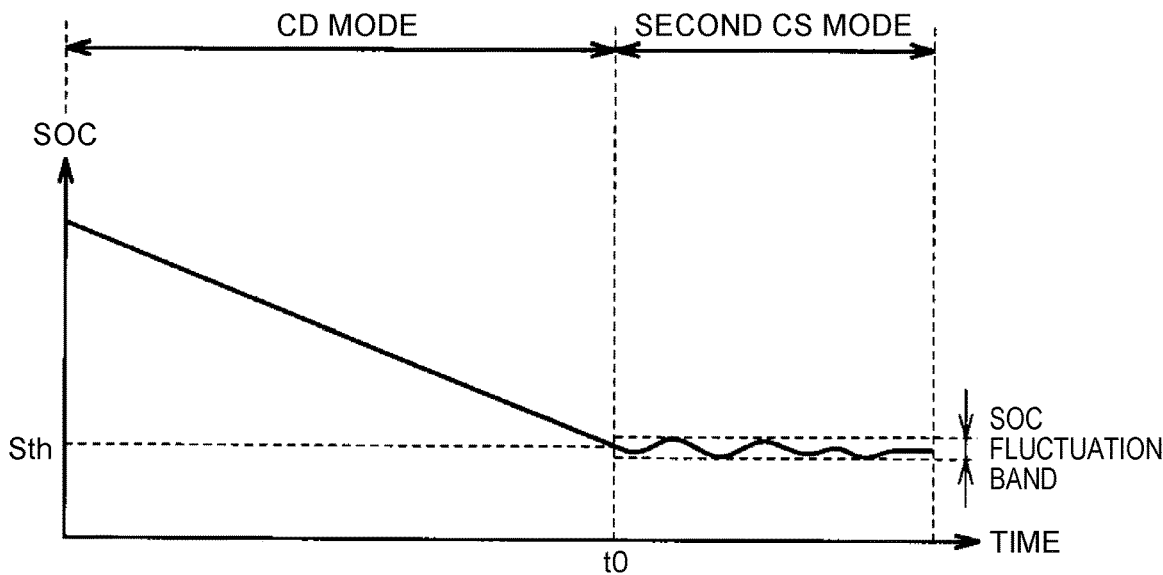
FIG. 4 is a diagram schematically showing an exemplary change in the SOC of an electric storage device and an exemplary change in control mode when a second CD-CS switching control is performed.

FIG. 4 is a diagram schematically showing an exemplary change in the SOC of the electric storage device 60 and an exemplary change in the control mode when the second CD-CS switching control is performed. In FIG. 4, the abscissa axis indicates time, and the ordinate axis indicates the SOC.

During the second CD-CS switching control, the HV-ECU 100 sets the SOC control mode to the CD mode until time t0 when the SOC decreases to the predetermined value Sth. During the CD mode, the engine 10 does not operate for sustaining the SOC. Accordingly, although the SOC sometimes increases temporarily by the regenerative electric power of the second MG 30 and the like, the SOC decreases gradually from the initial value at the start of use as a whole.

Then, the HV-ECU 100 sets the SOC control mode to the second CS mode (normal CS mode), after time t0 when the SOC decreases to the predetermined value Sth. During the second CS mode, the SOC immediately after the switching of the CS mode (the predetermined value Sth in the example shown in FIG. 4) is adopted as a reference value, and the charge-discharge amount of the electric storage device 60 (for example, the electric power generation amount of the first MG 20 using the dynamic power of the engine 10) is appropriately regulated such that the SOC is prevented from departing from the reference value. As a result, in the second CS mode, although the SOC can fluctuate in a predetermined range including the reference value, the SOC fluctuation band is restricted to a relatively small value, from the standpoint of the protection of the electric storage device 60.

First CD-CS Switching Control

Next, details of the first CD-CS switching control will be described.

The second CS mode is set after the SOC is depleted (after the SOC decreases to the predetermined value Sth), and therefore in the second CS mode, the permissible SOC fluctuation band is restricted to a relatively small value, from the standpoint of the protection of the electric storage device 60. That is, the charge-discharge amount of the electric storage device 60 (for example, the electric power generation amount of the first MG 20 using the engine 10) is regulated such that the SOC does not greatly fluctuate. From the influence, there is a concern that the driving state (operation or stop, output power in operation, and the like) of the engine 10 is easily limited by SOC requirement after the second CS mode is set, so that the fuel efficiency decreases.

Hence, when the planned traveling route for the vehicle 1 has been set, the HV-ECU 100 executes the "first CD-CS switching control" instead of the "second CD-CS switching control (normal CD-CS switching control)". The first CD-CS switching control is a control of predicting the traveling load on the planned traveling route to the destination of the vehicle 1 using the foreseen route information from the navigation device 130 and automatically performing the switching between the CD mode and the CS mode depending on the predicted load such that the SOC is depleted at the time of arrival at the destination.

During the first CD-CS switching control, the CS mode is set before the SOC is depleted (before the SOC decreases to the predetermined value Sth). Therefore, the need to protect the electric storage device 60 by sustaining the SOC is low during the CS mode set by the first CD-CS switching control (hereinafter, also referred to as a "first CS mode"). When the SOC fluctuation band, nevertheless, is restricted to a small value similarly to the second CS mode, there is a concern that the driving state of the engine 10 is unnecessarily limited. For example, there easily occurs a situation in which the engine 10 must be stopped for decreasing the SOC even at a high-load section (an expressway section, an upward gradient section, or the like) at which the thermal efficiency of the engine 10 is high. Further, there easily occurs a situation in which the engine 10 must be operated for increasing the SOC even at a low-load section (an urban section, a traffic congestion section, or the like) at which the thermal efficiency of the engine 10 is low, or there easily occurs a situation in which the output power of the engine 10 is not an optimal power. As a result, there is a concern that the fuel efficiency unnecessarily decreases even though the need to protect the electric storage device 60 is low.

In view of the above point, the HV-ECU 100 in the embodiment expands the permissible SOC fluctuation band during the first CS mode, compared to the permissible SOC fluctuation band during the second CS mode.

Figure 5:
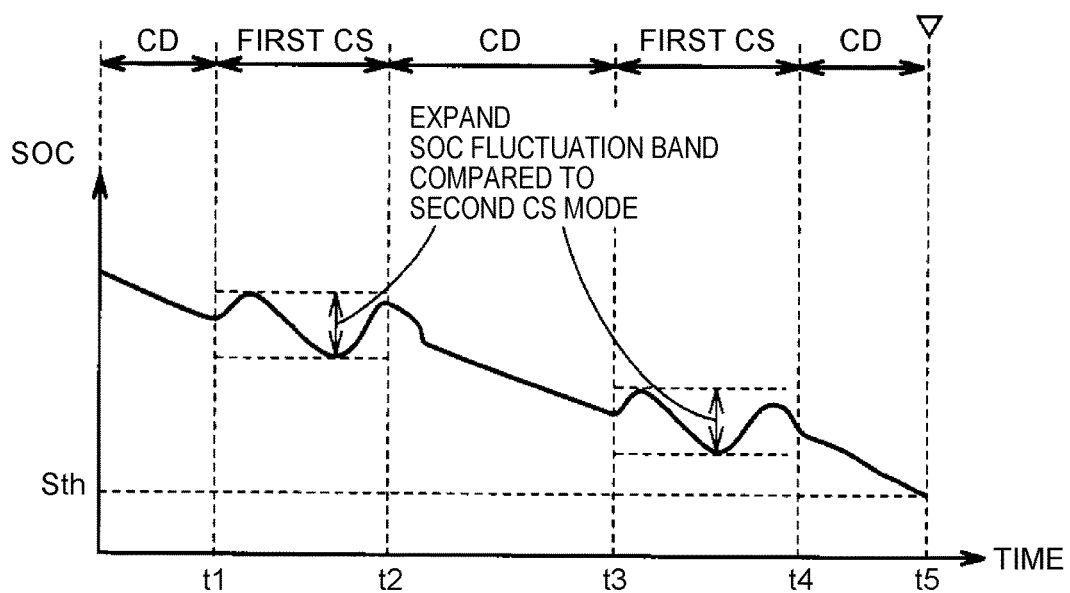
FIG. 5 is a diagram schematically showing an exemplary change in the SOC of the electric storage device and an exemplary change in the control mode when a first CD-CS switching control is performed.

FIG. 5 is a diagram schematically showing an exemplary change in the SOC of the electric storage device 60 and an exemplary change in the control mode when the first CD-CS switching control is performed. In FIG. 5, the abscissa axis indicates time, and the ordinate axis indicates the SOC.

During the first CD-CS switching control, the HV-ECU 100 performs the switching between the first CS mode and the CD mode based on the foreseen route information. In the example shown in FIG. 5, the SOC control mode is set to the first CS mode in a period from time t1 to time t2 and a period from time t3 to time t4, and the SOC control mode is set to the CD mode in the other periods.

The HV-ECU 100 in the embodiment expands the permissible SOC fluctuation band during the first CS mode, compared to the permissible SOC fluctuation band during the second CS mode. Thereby, during the first CS mode, the driving state (operation or stop, output power in operation, and the like) of the engine 10 is harder to be limited by the SOC requirement than during the second CS mode, and accordingly, the driving state of the engine 10 is easily determined in consideration of the thermal efficiency of the engine 10. As a result, it is possible to restrain the fuel efficiency from decreasing during the first CS mode.

Further, the HV-ECU 100 in the embodiment expands the permissible SOC fluctuation band during the first CS mode, compared to the permissible SOC fluctuation band during the CS mode set through a manual operation by the user (hereinafter, also referred to as a "manual CS mode"). Thereby, during the first CS mode, the driving state of the engine 10 is harder to be limited by the SOC requirement than during the manual CS mode, and accordingly, it is possible to restrain the fuel efficiency from decreasing.

Figure 6:
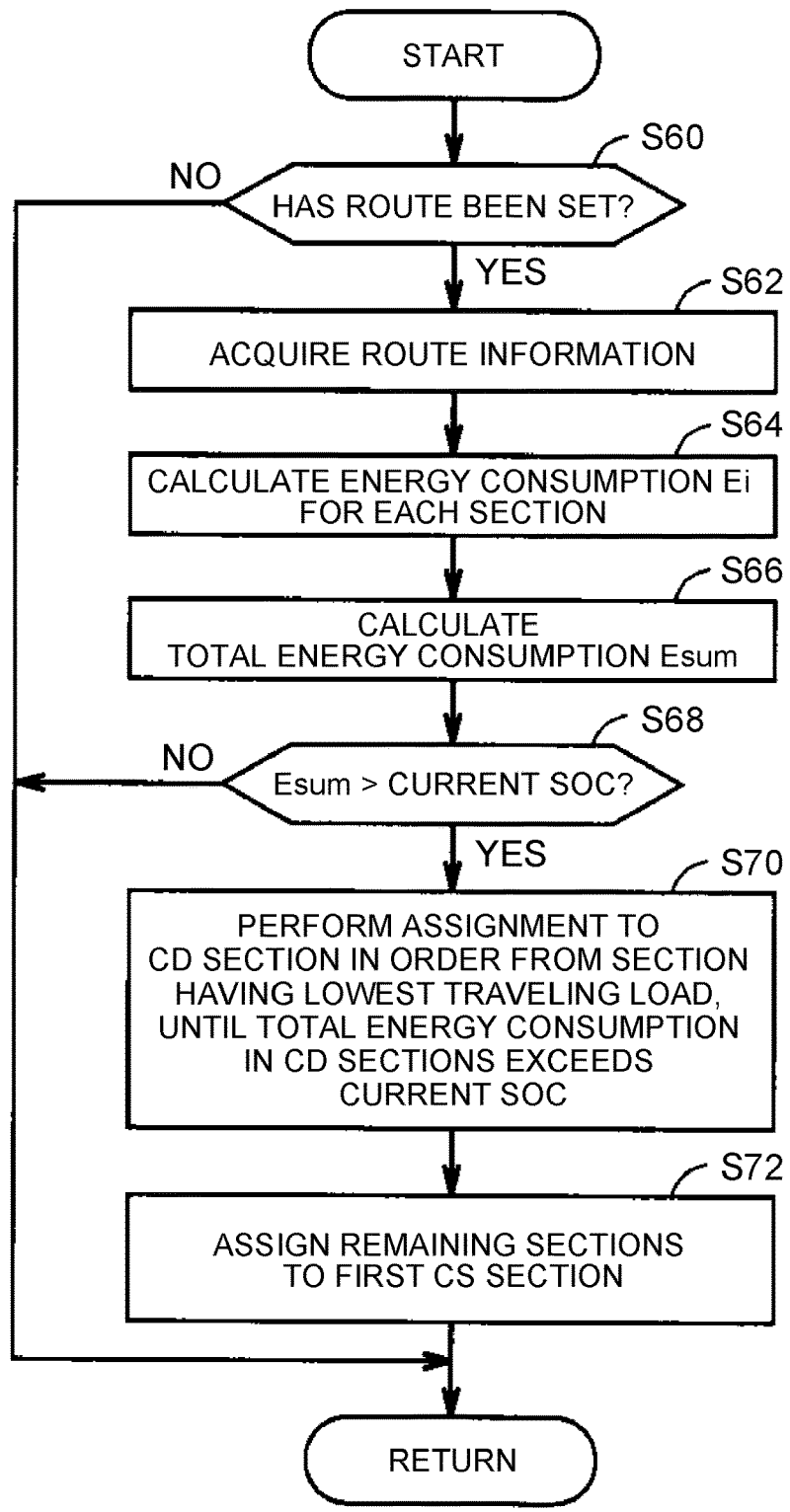
FIG. 6 is a flowchart (2) showing an exemplary processing procedure of the HV-ECU.

FIG. 6 is a flowchart showing an exemplary processing procedure for setting a section at which the HV-ECU 100 performs the first CS mode (hereinafter, also referred to as a "first CS section"). The flowchart is repeatedly executed in a predetermined cycle.

The HV-ECU 100 determines whether the planned traveling route for the vehicle 1 has been set (step S60). When the planned traveling route has not been set (NO in step S60), the HV-ECU 100 cannot predict a future traveling load, and therefore, returns the process by skipping the subsequent processes (without setting the first CS section).

When the planned traveling route has been set (YES in step S60), the HV-ECU 100 acquires the foreseen route information about the planned traveling route, from the navigation device 130 (step S62). The foreseen route information includes a plurality of sections (links) i included in the planned traveling route, gradient information, road category information (information such as urban road, expressway and general road), road traffic information (traffic congestion information and the like) about each section i, and the like.

Next, the HV-ECU 100 calculates an energy consumption Ei for each section, based on the gradient information, road category information and road traffic information about each section i that are included in the foreseen route information (step S64).

Next, the HV-ECU 100 calculates the sum total of the energy consumption Ei for the sections i, as a total energy consumption Esum (step S66).

Next, the HV-ECU 100 determines whether the total energy consumption Esum calculated in step S66 is more than the SOC at the current time (hereinafter, also referred to as merely a "current SOC") (step S68). This process is a process for determining whether the vehicle 1 can travel on the planned traveling route in only the CD mode.

When the HV-ECU 100 does not determine that the total energy consumption Esum is more than the current SOC (NO in step S68), the HV-ECU 100 does not need to set the first CS section, because the vehicle 1 can travel on the planned traveling route in only the CD mode. Therefore, the HV-ECU 100 skips the subsequent processes, and returns the process.

When the HV-ECU 100 determines that the total energy consumption Esum is more than the current SOC (YES in step S68), the HV-ECU 100 assigns a plurality of sections included in the planned traveling route, to a section at which the CD mode is performed (hereinafter, also referred to as a "CD section"), in order from the section having the lowest traveling load (step S70). On this occasion, the HV-ECU 100 performs the assignment to the CD section in order, until the total energy consumption in CD sections exceeds the current SOC.

After the HV-ECU 100 completes the assignment to the CD section, the HV-ECU 100 assigns, to the first CS section, the remaining sections that are the plurality of sections included in the planned traveling route and that are not assigned to the CD section (step S72).

Figure 7:
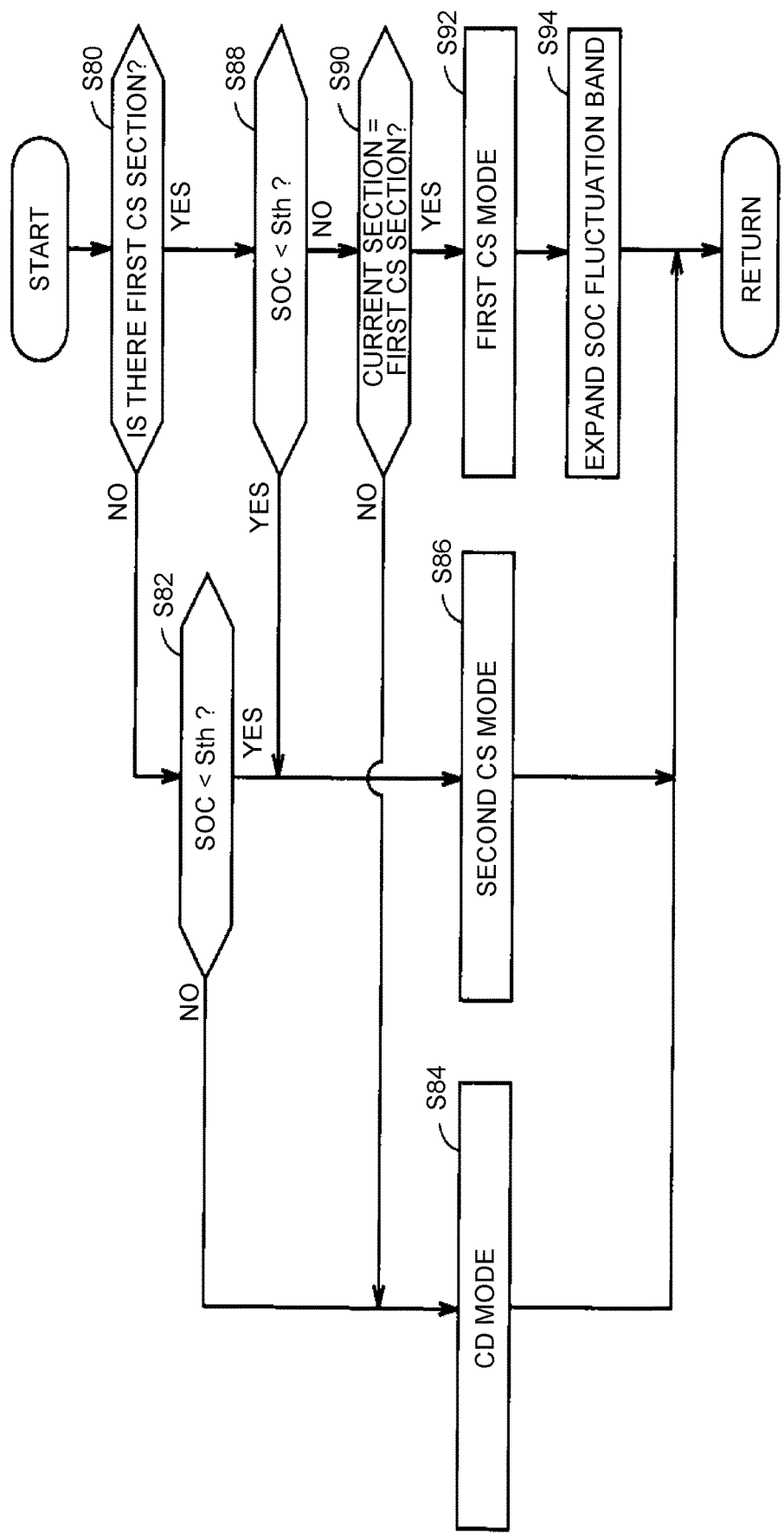
FIG. 7 is a flowchart (3) showing an exemplary processing procedure of the HV-ECU.

FIG. 7 is a flowchart showing an exemplary processing procedure that is executed by the HV-ECU 100 for the switching between the CD mode and the CS mode. The flowchart is repeatedly executed in a predetermined cycle.

The HV-ECU 100 determines whether there is a first CS section set by the process in step S72 of FIG. 6 (step S80).

When there is no first CS section (NO in step S80), the HV-ECU 100 performs the "second CD-CS switching control". Specifically, the HV-ECU 100 determines whether there is a history showing that the SOC decreased to less than the predetermined value Sth in this trip (in a period from the activation of a control system of the vehicle 1 to the next stop) (step S82). When there is no history showing that the SOC decreased to less than the predetermined value Sth (NO in step S82), the HV-ECU 100 sets the SOC control mode to the CD mode (step S84). When there is a history showing that the SOC decreased to less than the predetermined value Sth (YES in step S82), the HV-ECU 100 sets the SOC control mode to the CS mode (step S86).

On the other hand, when there is a first CS section (YES in step S80), the HV-ECU 100 determines whether there is a history showing that the SOC decreased to less than the predetermined value Sth in this trip (step S88).

When there is a history showing that the SOC decreased to less than the predetermined value Sth (YES in step S88), the HV-ECU 100 sets the SOC control mode to the second CS mode, for the protection of the electric storage device 60 (step S86).

When there is no history showing that the SOC decreased to less than the predetermined value Sth (NO in step S88), the HV-ECU 100 performs the "first CD-CS switching control". Specifically, the HV-ECU 100 determines whether the section (current section) at which the vehicle 1 is currently traveling is the first CS section (step S90). When the current section is not the first CS section (NO in step S90), the HV-ECU 100 sets the SOC control mode to the CD mode (step S84). When the current section is the first CS section (YES in step S90), the HV-ECU 100 sets the SOC control mode to the first CS mode (step S92).

Then, the HV-ECU 100 expands the permissible SOC fluctuation band during the first CS mode, compared to the permissible SOC fluctuation band during the second CS mode (step S94). As the expansion technique for the SOC fluctuation band, various techniques are possible.

The HV-ECU 100 in the embodiment expands the SOC fluctuation band by regulating the "required charge-discharge power Pb" that is used for the calculation of the required engine power Pe in the driving control. Specifically, the HV-ECU 100 disables the guard process in step S34 of FIG. 3 (the HV-ECU 100 does not execute the guard process). Thereby, the required charge-discharge power Pb to be used for the calculation of the required engine power Pe is the required charge-discharge power calculated using the optimal fuel efficiency map, that is, the required charge-discharge power in which only the thermal efficiency of the engine 10 is considered with no consideration of the SOC. Thereby, the SOC following speed decreases, so that the SOC is hard to follow the reference value. As a result, the SOC fluctuation band is expanded. In this way, the HV-ECU 100 in the embodiment expands the permissible SOC fluctuation band during the first CS mode, by a simple process of disabling the guard process for the required charge-discharge power Pb.

The technique for regulating the required charge-discharge power Pb such that the SOC fluctuation band is expanded is not limited to the technique of disabling the guard process. For example, the HV-ECU 100 may relax the restriction by the guard process, instead of completely disabling the guard process. Specifically, the HV-ECU 100 may change the "upper and lower limit map" to be used for the calculation of the upper and lower limit guard values in step S32 of FIG. 3, such that the SOC following speed decreases. Further, for example, the HV-ECU 100 may alter the "optimal fuel efficiency map" to be used for the calculation of the required charge-discharge power Pb in step S30 of FIG. 3, such that the SOC following speed decreases. By these techniques also, it is possible to regulate the required charge-discharge power Pb such that the SOC fluctuation band is expanded.

Further, the expansion technique for the SOC fluctuation band is not limited to the technique of regulating the required charge-discharge power Pb. For example, the HV-ECU 100 may change the "engine start threshold Pstart" to be used for the determination (step S40 in FIG. 3) of whether to start the engine 10 in the driving control, or may change the "engine stop threshold Pstop" to be used for the determination (step S50 in FIG. 3) of whether to stop the engine 10. Further, when the HV-ECU 100 directly restricts the SOC fluctuation band by controlling the SOC between an upper limit SOC and a lower limit SOC, the HV-ECU 100 may expand the SOC fluctuation band by increasing the upper limit SOC or decreasing the lower limit SOC.

As described above, when the planned traveling route for the vehicle 1 has been set, the HV-ECU 100 in the embodiment executes the first CD-CS switching control. On this occasion, the HV-ECU 100 expands the permissible SOC fluctuation band during the "first CS mode" set by the first CD-CS switching control, compared to the permissible SOC fluctuation band during the other CS modes (the second CS mode and the manual CS mode). Thereby, during the first CS mode, the driving state of the engine 10 is harder to be limited by the SOC requirement than during the other CS modes, and accordingly, the engine 10 can be efficiently operated. As a result, it is possible to restrain the fuel efficiency from decreasing during the first CS mode.

Particularly, when the SOC is more than the predetermined value Sth (that is, when the need to protect the electric storage device 60 is low), the HV-ECU 100 in the embodiment sets the first CS mode, and expands the SOC fluctuation band during the CS mode. Therefore, during the first CS mode, it is possible to restrain the fuel efficiency from unnecessarily decreasing even though the need to protect the electric storage device 60 is low.

First Modification

In the example shown in the embodiment, the HV-ECU 100 expands the permissible SOC fluctuation band during the first CS mode regardless of the vehicle speed VS. However, the HV-ECU 100 may expand the permissible SOC fluctuation band during the first CS mode, depending on the vehicle speed VS.

Figure 8:
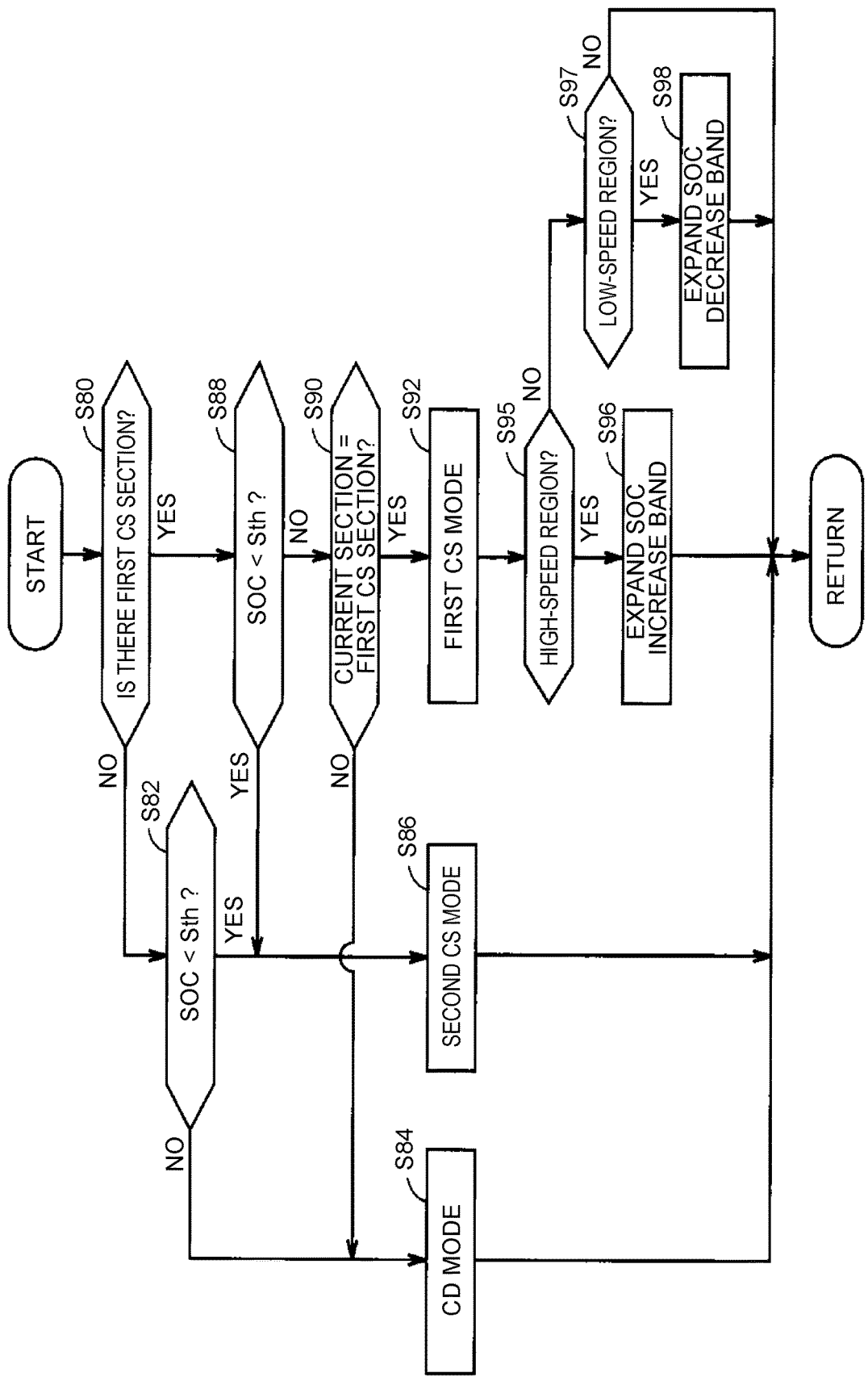
FIG. 8 is a flowchart (4) showing an exemplary processing procedure of the HV-ECU.

FIG. 8 is a flowchart showing an exemplary processing procedure that is executed by an HV-ECU 100 in a first modification for the switching between the CD mode and the CS mode. In the flowchart of FIG. 8, processes of steps S95 to S98 are added, instead of the process of step S94 in the flowchart of FIG. 7. The other steps (the steps having the same reference characters as the steps shown in FIG. 7) have been already described, and therefore, detailed descriptions will not be repeated.

After the HV-ECU 100 sets the SOC control mode to the first CS mode in step S92, the HV-ECU 100 determines whether the vehicle speed VS is included in a high-speed region higher than a high-speed threshold (step S95).

When the vehicle speed VS is included in the high-speed region (YES in step S95), the HV-ECU 100 expands a permissible SOC increase band during the first CS mode by decreasing the "engine stop threshold Pstop" to be used in step S50 of FIG. 3, compared to when the vehicle speed VS is not included in the high-speed region (step S96).

Thereby, the SOC increase band in the high-speed region during the first CS mode is expanded. Thereby, in the high-speed region, in which the thermal efficiency of the engine 10 is high, the engine 10 is hard to be stopped, and a state where the engine 10 is operating is easily sustained. As a result, it is possible to operate the engine 10 more efficiently, and it is possible to improve the fuel efficiency.

On the other hand, when the vehicle speed VS is not included in the high-speed region (NO in step S95), the HV-ECU 100 determines whether the vehicle speed VS is included in a low-speed region lower than a low-speed threshold (step S97).

When the vehicle speed VS is included in the low-speed region (YES in step S97), the HV-ECU 100 expands a permissible SOC decrease band during the first CS mode by increasing the "engine start threshold Pstart" to be used in step S40 of FIG. 3, compared to when the vehicle speed VS is not included in the low-speed region (step S98).

Thereby, the SOC decrease band in the low-speed region during the first CS mode is expanded. Thereby, in the low-speed region, in which the thermal efficiency of the engine 10 is low, the engine 10 is hard to be started, and a state where the engine 10 is stopped is easily sustained. As a result, it is possible to make the engine 10 operate harder in the state where the thermal efficiency is low, and it is possible to restrain the decrease in the fuel efficiency more appropriately.

In this way, during the first CS mode, the HV-ECU 100 may expand the permissible SOC increase band in the case of a high vehicle speed, and may expand the permissible SOC decrease band in the case of a low vehicle speed.

Second Modification

In the example shown in the first modification, during the first CS mode, the HV-ECU 100 expands the permissible SOC increase band in the case of a high vehicle speed, and expands the permissible SOC decrease band in the case of a low vehicle speed. However, during the first CS mode, the HV-ECU 100 may expand the permissible SOC fluctuation band, when the engine 10 is operating.

Figure 9:
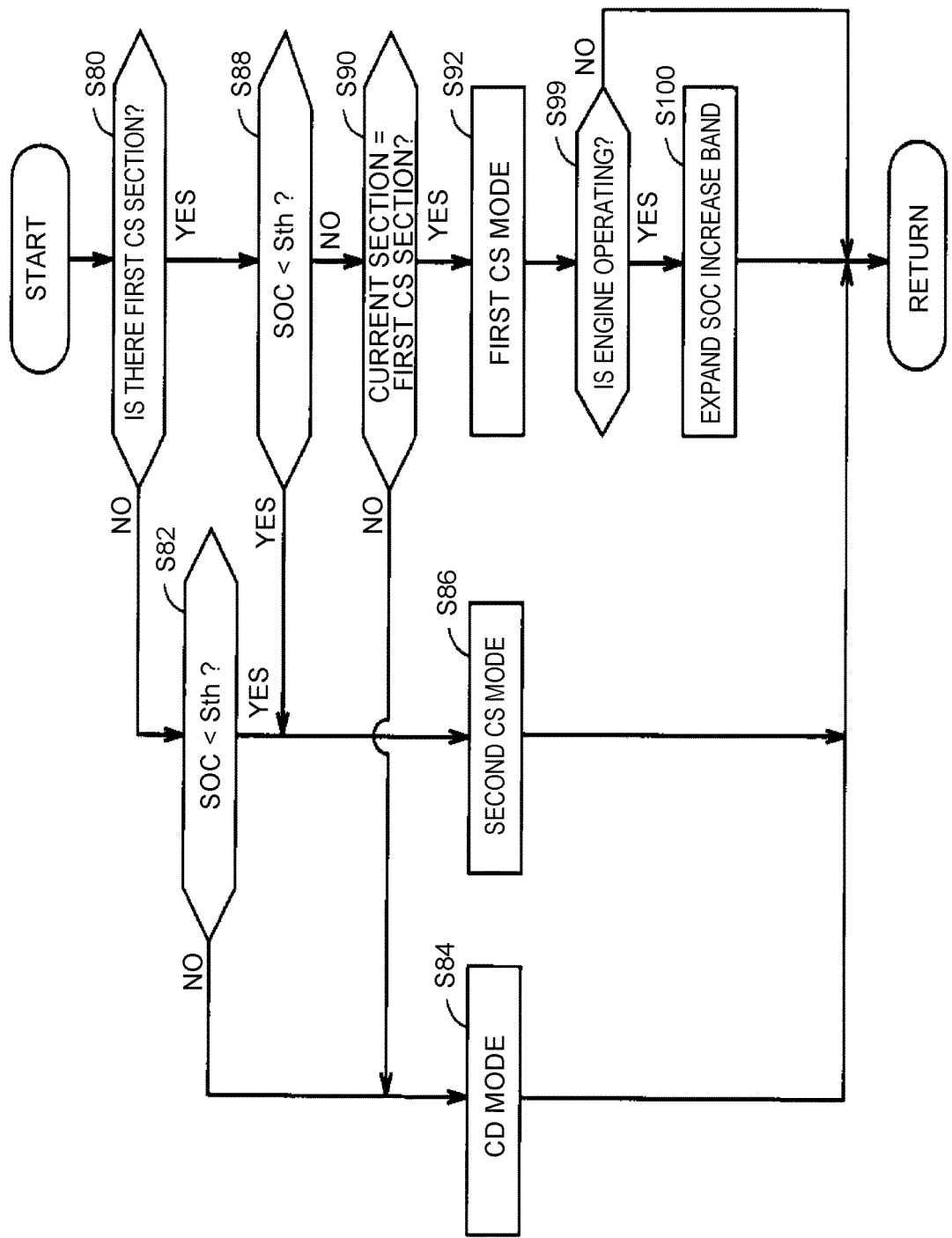
FIG. 9 is a flowchart (5) showing an exemplary processing procedure of the HV-ECU.

FIG. 9 is a flowchart showing an exemplary processing procedure that is executed by an HV-ECU 100 in a second modification for the switching between the CD mode and the CS mode. In the flowchart of FIG. 9, processes of step S99 and step S100 are added, instead of the process of step S94 in the flowchart of FIG. 7. The other steps (the steps having the same reference characters as the steps shown in FIG. 7) have been already described, and therefore, detailed descriptions will not be repeated.

After the HV-ECU 100 sets the SOC control mode to the first CS mode in step S92, the HV-ECU 100 determines whether the engine 10 is operating (step S99). When the engine 10 is not operating (NO in step S99), the HV-ECU 100 skips the subsequent process, and returns the process.

When the engine 10 is operating (YES in step S99), the HV-ECU 100 expands the permissible SOC increase band during the first CS mode by decreasing the "engine stop threshold Pstop" to be used in step S50 of FIG. 3, compared to when the engine 10 is not operating (step S100).

Thereby, when the engine 10 is operating in the first CS mode, the engine 10 is hard to be stopped, and accordingly, the number of starts of the engine 10 is reduced. As a result, it is possible to improve drivability.

Third Modification

In the embodiment, the HV-ECU 100 expands the permissible SOC fluctuation band during the first CS mode. However, in the first CD-CS switching control, the HV-ECU 100 performs the assignment to the CD section and the first CS section such that the SOC is depleted at the time of the arrival at the destination. Therefore, when the HV-ECU 100 expands the SOC fluctuation band (SOC increase band) at the first CS section in spite of a near destination, there is a concern that the SOC higher than expected remains at the time of the arrival at the destination.

In view of the above point, an HV-ECU 100 in a third modification reduces the permissible SOC increase band, when the remaining distance to the destination becomes shorter than a threshold distance Dth during the expansion of the permissible SOC fluctuation band during the first CS mode. Thereby, it is possible to restrain the SOC from being higher than expected, at the time of the arrival at the destination.

As the technique for reducing the permissible SOC increase band, various techniques are possible. For example, the HV-ECU 100 may change the upper and lower limit guard values of the required charge-discharge power Pb, depending on the remaining distance to the destination. Further, the HV-ECU 100 may return the SOC fluctuation band (both of the SOC increase band and the SOC decrease band) to a level in the second CS mode, by setting the SOC control mode to the second CS mode. The HV-ECU 100 may reduce the SOC increase band while expanding the SOC decrease band.

In the following, an example of returning the SOC fluctuation band (both of the SOC increase band and the SOC decrease band) to a level in the second CS mode by setting the SOC control mode to the second CS mode will be described.

Figure 10:
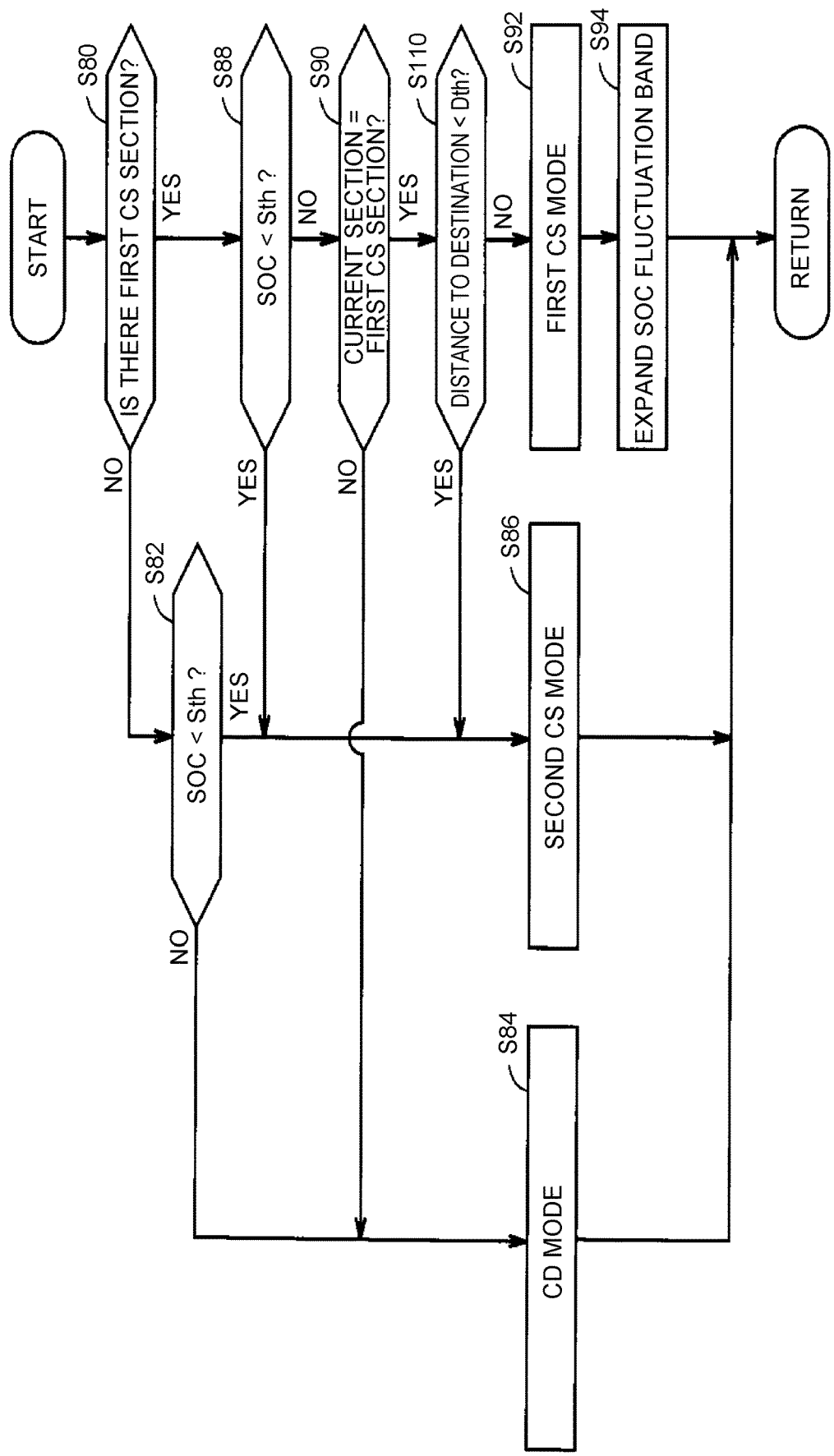
FIG. 10 is a flowchart (6) showing an exemplary processing procedure of the HV-ECU.

FIG. 10 is a flowchart showing an exemplary processing procedure that is executed by an HV-ECU 100 in a third modification for the switching between the CD mode and the CS mode. In the flowchart of FIG. 10, a process of step S110 is added to the flowchart of FIG. 7. The other steps (the steps having the same reference characters as the steps shown in FIG. 7) have been already described, and therefore, detailed descriptions will not be repeated.

When the HV-ECU 100 determines in step S90 that the current section is the first CS section (YES in step S90), the HV-ECU 100 determines whether the remaining distance to the destination is shorter than the threshold distance Dth (step S110).

When the HV-ECU 100 does not determine that the remaining distance to the destination is shorter than the threshold distance Dth (NO in step S110), the HV-ECU 100 sets the SOC control mode to the first CS mode (step S92), and expands the permissible SOC fluctuation band compared to the second CS mode (step S94).

On the other hand, when the HV-ECU 100 determines that the remaining distance to the destination is shorter than the threshold distance Dth (YES in step S110), the HV-ECU 100 sets the SOC control mode to the second CS mode, instead of the first CS mode (step S86). Thereby, when the remaining distance to the destination is shorter than the threshold distance Dth, the permissible SOC increase band is reduced compared to when the first CS mode is sustained. Thereby, it is possible to restrain the SOC from being higher than expected, at the time of the arrival at the destination.

Fourth Modification

In the embodiment, the HV-ECU 100 expands the permissible SOC fluctuation band during the first CS mode.

However, when the HV-ECU 100 expands the SOC fluctuation band (SOC decrease band) during the first CS mode even through the SOC has decreased to a value close to the predetermined value Sth (a value slightly larger than the predetermined value Sth), there is a concern that the SOC decreases to the predetermined value Sth before the arrival at the destination and the first CD-CS switching control ends earlier than expected.

In view of the above point, the HV-ECU 100 in a fourth modification reduces the permissible SOC decrease band when the SOC becomes lower than a threshold level S1 (S1>Sth) during the expansion of the permissible SOC fluctuation band during the first CS mode. Thereby, it is possible to restrain the SOC from decreasing to the predetermined value Sth before the arrival at the destination, and it is possible to restrain the first CD-CS switching control from ending earlier than expected.

As the technique for reducing the permissible SOC decrease band, various techniques are possible. For example, the HV-ECU 100 may return the SOC fluctuation band (both of the SOC increase band and the SOC decrease band) to a level in the second CS mode. The HV-ECU 100 may reduce the SOC decrease band while expanding the SOC increase band.

In the following, an example of returning the SOC fluctuation band (both of the SOC increase band and the SOC decrease band) to a level in the second CS mode by setting the SOC control mode to the second CS mode will be described.

Figure 11:
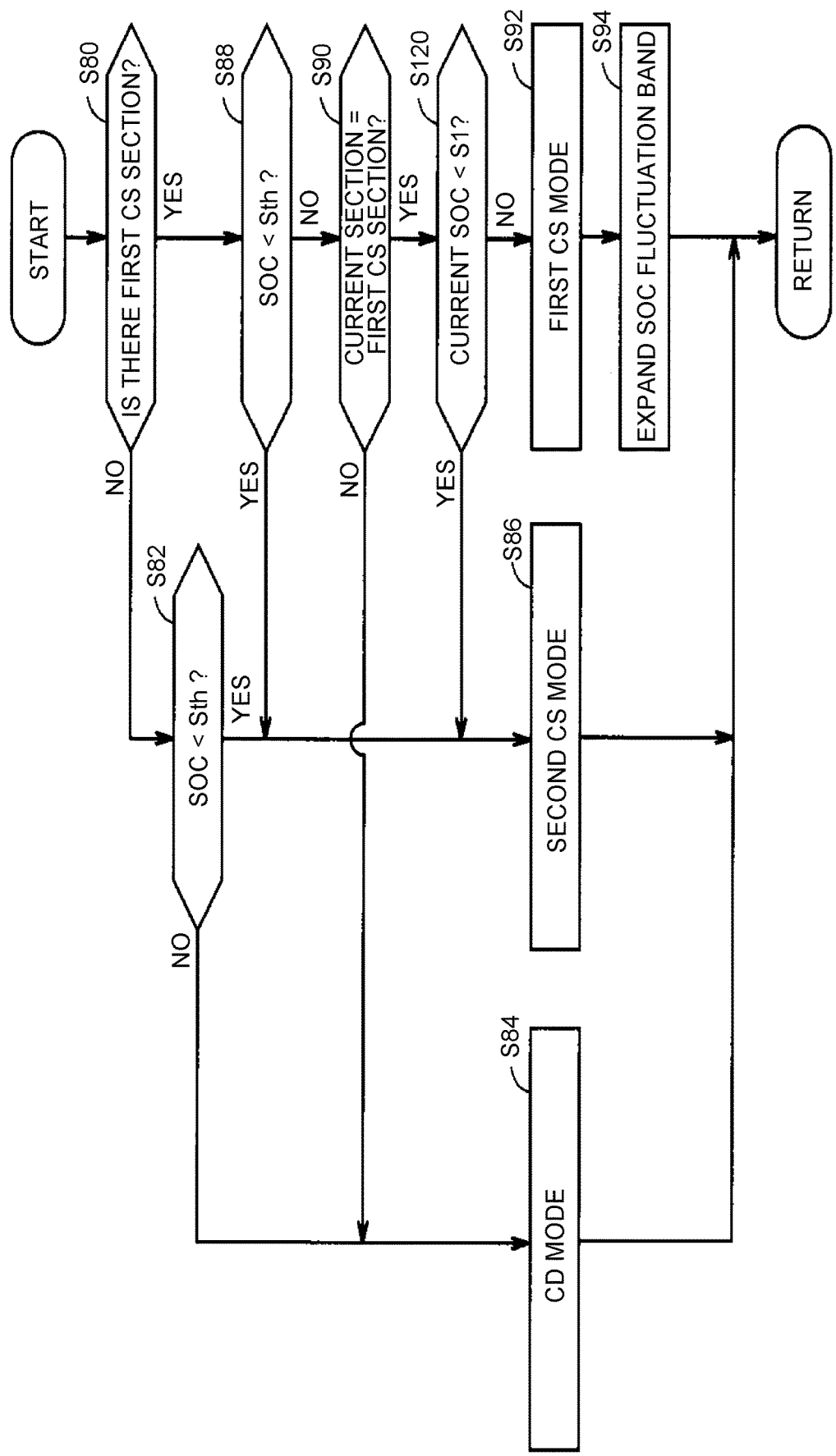
FIG. 11 is a flowchart (7) showing an exemplary processing procedure of the HV-ECU.

FIG. 11 is a flowchart showing an exemplary processing procedure that is executed by an HV-ECU 100 in a fourth modification for the switching between the CD mode and the CS mode. In the flowchart of FIG. 11, a process of step S120 is added to the flowchart of FIG. 7. The other steps (the steps having the same reference characters as the steps shown in FIG. 7) have been already described, and therefore, detailed descriptions will not be repeated.

When the HV-ECU 100 determines in step S90 that the current section is the first CS section (YES in step S90), the HV-ECU 100 determines whether the current SOC is lower than the threshold level S1 (step S120). Here, the threshold level S1 is set to a value slightly larger than the predetermined value Sth.

When the HV-ECU 100 does not determine that the current SOC is lower than the threshold level S1 (NO in step S120), the HV-ECU 100 sets the SOC control mode to the first CS mode (step S92), and expands the permissible SOC fluctuation band compared to the second CS mode (step S94).

On the other hand, when the HV-ECU 100 determines that the current SOC is lower than the threshold level S1 (YES in step S120), the HV-ECU 100 sets the SOC control mode to the second CS mode, instead of the first CS mode (step S86). Thereby, when the current SOC is lower than the threshold level S1, the permissible SOC decrease band is reduced compared to when the first CS mode is sustained. Thereby, it is possible to restrain the SOC from decreasing to the predetermined value Sth before the arrival at the destination, and it is possible to restrain the first CD-CS switching control from ending earlier than expected.

The embodiment and the first to fourth modifications may be appropriately combined as long as technological consistency is kept.

It should be considered that the embodiments disclosed in the specification are examples and are not limitative in all respects. It is intended that the scope of the disclosure is specified by the claims instead of the above description and includes all modifications in meanings and scopes equivalent to the claims.

What is claimed is:

1. A hybrid vehicle comprising:
   an internal combustion engine;
   a motor generator connected with at least one of the internal combustion engine and a drive wheel;
   an electric storage device electrically connected with the motor generator; and
   an electronic control device (ECU), including at least one processor, programmed to:
   set a control mode of an electric storage level of the electric storage device, to one of a charge depleting mode and a charge sustaining mode;
   perform a first switching control, which is a control in which the ECU automatically performs switching between the charge depleting mode and the charge sustaining mode based on a predicted load on a planned traveling route for the hybrid vehicle; and
   when the first switching control is performed to switch the control mode from the charge depleting mode to the charge sustaining mode due to the predicted load on the planned traveling route, expand a permissible fluctuation band of the electric storage level of the electric storage device during the charge sustaining mode, compared to when the charge sustaining mode is set without performing the first switching control due to the predicted load.

2. The hybrid vehicle according to claim 1, wherein the ECU is further programmed to expand the permissible fluctuation band of the electric storage level during the charge sustaining mode, when the ECU is performing the first switching control and the electric storage level is higher than a lower limit of the electric storage level allowing traveling in the charge depleting mode, compared to when the ECU is not performing the first switching control.

3. The hybrid vehicle according to claim 1, wherein the ECU is further programmed to:
prevent the electric storage level from departing from a reference value by performing a guard process of restricting a required charge-discharge power of the electric storage device within a range between an upper limit guard value and a lower limit guard value, and
expand the permissible fluctuation band of the electric storage level during the charge sustaining mode by disabling or relaxing the restriction of the required charge-discharge power by the guard process.

4. The hybrid vehicle according to claim 1, wherein the ECU is further programmed to stop the internal combustion engine when a required power decreases to less than a stop threshold during operation of the internal combustion engine, and to expand a permissible increase band of the electric storage level during the charge sustaining mode by decreasing the stop threshold when the control device is performing the first switching control and a vehicle speed is included in a high-speed region, compared to when the control device is not performing the first switching control.

5. The hybrid vehicle according to claim 1, wherein the ECU is further programmed to start the internal combustion engine when a required power of the internal combustion engine exceeds a start threshold during stop of the internal combustion engine, and to expand a permissible decrease band of the electric storage level during the charge sustaining mode by increasing the start threshold when the control device is performing the first switching control and a vehicle speed is included in a low-speed region, compared to when the control device is not performing the first switching control.

6. The hybrid vehicle according to claim 1, wherein the ECU is further programmed to stop the internal combustion engine when a required power decreases to less than a stop threshold during operation of the internal combustion engine, and to expand a permissible increase band of the electric storage level during the charge sustaining mode by decreasing the stop threshold when the control device is performing the first switching control and the internal combustion engine is operating, compared to when the control device is not performing the first switching control.

7. The hybrid vehicle according to claim 1, wherein the ECU is further programmed to reduce a permissible increase band of the electric storage level when a remaining distance to a destination becomes shorter than a threshold distance during an expansion of the fluctuation band of the electric storage level of the electric storage device.

8. The hybrid vehicle according to claim 1, wherein the ECU is further programmed to reduce a permissible decrease band of the electric storage level when the electric storage level becomes lower than a threshold level during an expansion of the fluctuation band of the electric storage level of the electric storage device.

9. The hybrid vehicle according to claim 1, wherein, when the first switching control is not being performed, a second switching control may be performed that is a control in which the ECU automatically performs switching between the charge depleting mode and the charge sustaining mode based on a state-of-charge of the electric storage device.

10. The hybrid vehicle according to claim 1, wherein, for the first switching control, the ECU assigns a plurality of sections included in the planned traveling route, calculates a traveling load for each of the plurality of sections in order from having a lowest traveling load to a highest traveling load, and assigns the charge depleting mode to the plurality of sections, beginning with the section having the lowest traveling load, until a total energy consumption in the assigned sections is more than a current state-of-charge of the electric storage device.

* * * * *